(12) United States Patent
Xu

(10) Patent No.: US 8,243,441 B2
(45) Date of Patent: Aug. 14, 2012

(54) BATTERY COVER STRUCTURE

(75) Inventor: Bang-Xi Xu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 357 days.

(21) Appl. No.: 12/561,356

(22) Filed: Sep. 17, 2009

(65) Prior Publication Data
US 2010/0210324 A1 Aug. 19, 2010

(30) Foreign Application Priority Data

Feb. 16, 2009 (CN) .......................... 2009 1 0300429

(51) Int. Cl.
*H05K 5/00* (2006.01)
*H05K 7/00* (2006.01)

(52) U.S. Cl. ......... 361/679.56; 361/679.55; 361/679.01; 455/575.1; 455/575.8

(58) Field of Classification Search ............. 361/679.01, 361/679.55, 679.56; 455/575.1, 575.8
See application file for complete search history.

(56) References Cited

U.S. PATENT DOCUMENTS

| 7,488,555 | B2 * | 2/2009 | Chen et al. ..................... 429/100 |
| 7,839,627 | B2 * | 11/2010 | Tanaka et al. .............. 361/679.3 |
| 2004/0224220 | A1 * | 11/2004 | Wang et al. ..................... 429/96 |
| 2004/0224221 | A1 * | 11/2004 | Chen et al. ....................... 429/96 |

* cited by examiner

*Primary Examiner* — Anthony Haughton
(74) *Attorney, Agent, or Firm* — Altis Law Group, Inc.

(57) ABSTRACT

A battery cover structure includes a main body, a cover and a connecting module. The main body includes at least one latching portion. The main body defines a cavity for receiving a battery. The cavity includes an end wall. A protruding portion extends from the wall, and a gap is formed between the protruding portion and the wall. The cover includes at least one engaging portion engaged with the at least one latching portion. The connecting module includes a sliding member, at least one elastic element and a shaft. The sliding member is slidably attached to the cover. The shaft includes a middle portion received in the gap of the main body. The sliding member and the cover are rotatably attached to the main body by the shaft.

20 Claims, 9 Drawing Sheets

BATTERY COVER STRUCTURE

BACKGROUND

1. Technical Field

The present disclosure relates to portable electronic devices, particularly, to a battery cover structure for use in a portable electronic device.

2. Description of Related Art

Portable electronic devices such as mobile phones, personal digital assistants, etc., generally have main bodies and battery covers. A portable electronic generally includes a battery cover structure, which is used to attach the battery cover to the main body. In a conventional portable electronic device, the battery cover needs to be detached from the main body to replace a battery. After replacing the battery, user may forget to reattach the cover to the main body resulting in possible lost or misplace of the cover.

Therefore, there is room for improvement within the art.

BRIEF DESCRIPTION OF THE DRAWINGS

Many aspects of the battery cover structure can be better understood with reference to the following drawings. The components in the drawings are not necessarily drawn to scale, the emphasis instead being placed upon clearly illustrating the principles of the battery cover structure, in which.

DETAILED DESCRIPTION OF THE EMBODIMENTS

Figure 1:
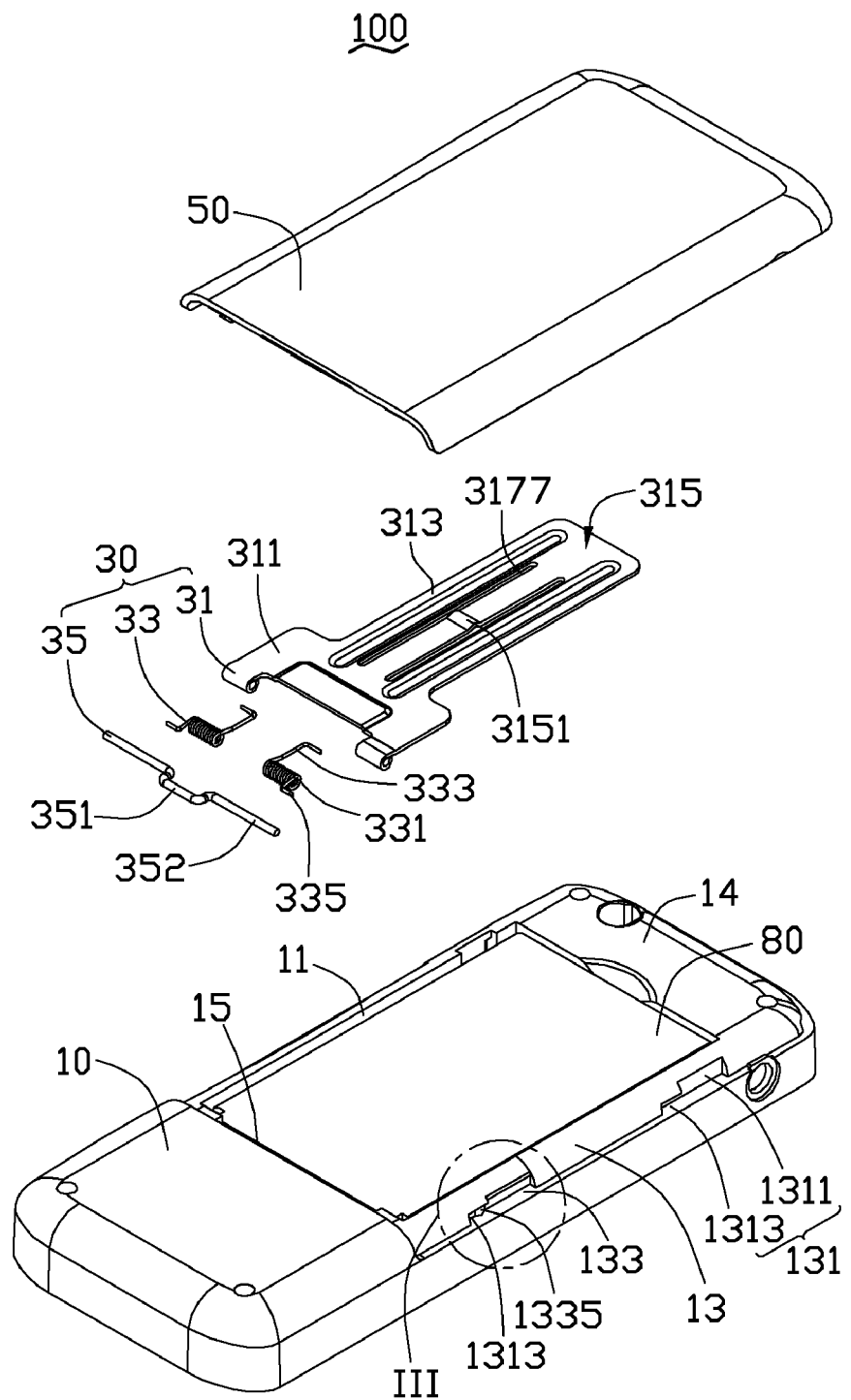
FIG. 1 is an exploded, schematic view of a battery cover structure, in accordance with an exemplary embodiment, the battery cover structure including a main body, a connecting module and a cover.
Figure 2:
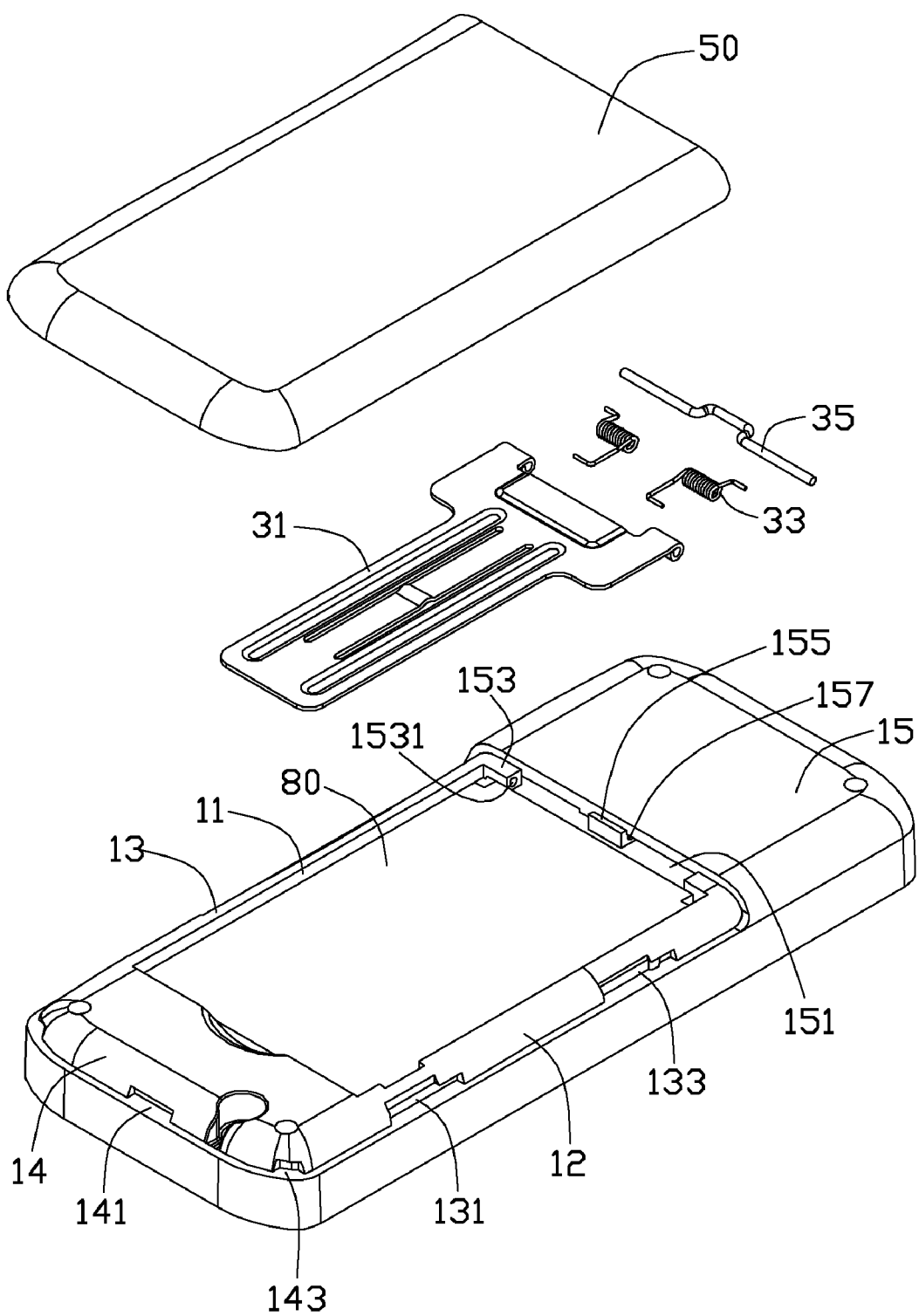
FIG. 2 is similar to FIG. 1, but showing from another aspect.

Referring to FIGS. 1-2, a battery cover structure 100 is applied to a portable electronic device (not labeled), in accordance with an exemplary embodiment. The battery cover structure 100 includes a main body 10, a connecting module 30 and a cover 50.

The main body 10 defines a cavity 11 for receiving a battery 80. The cavity 11 has an end wall 151. A protruding portion 155 extends from a middle portion of the end wall 151. The protruding portion 155 is L-shaped, and a gap 157 is defined between the protruding portion 155 and the end wall 151. Two ledges 153 are respectively formed at two ends of the end wall 151 and face with each other. Each ledge 153 defines a shaft hole 1531.

Figure 3:
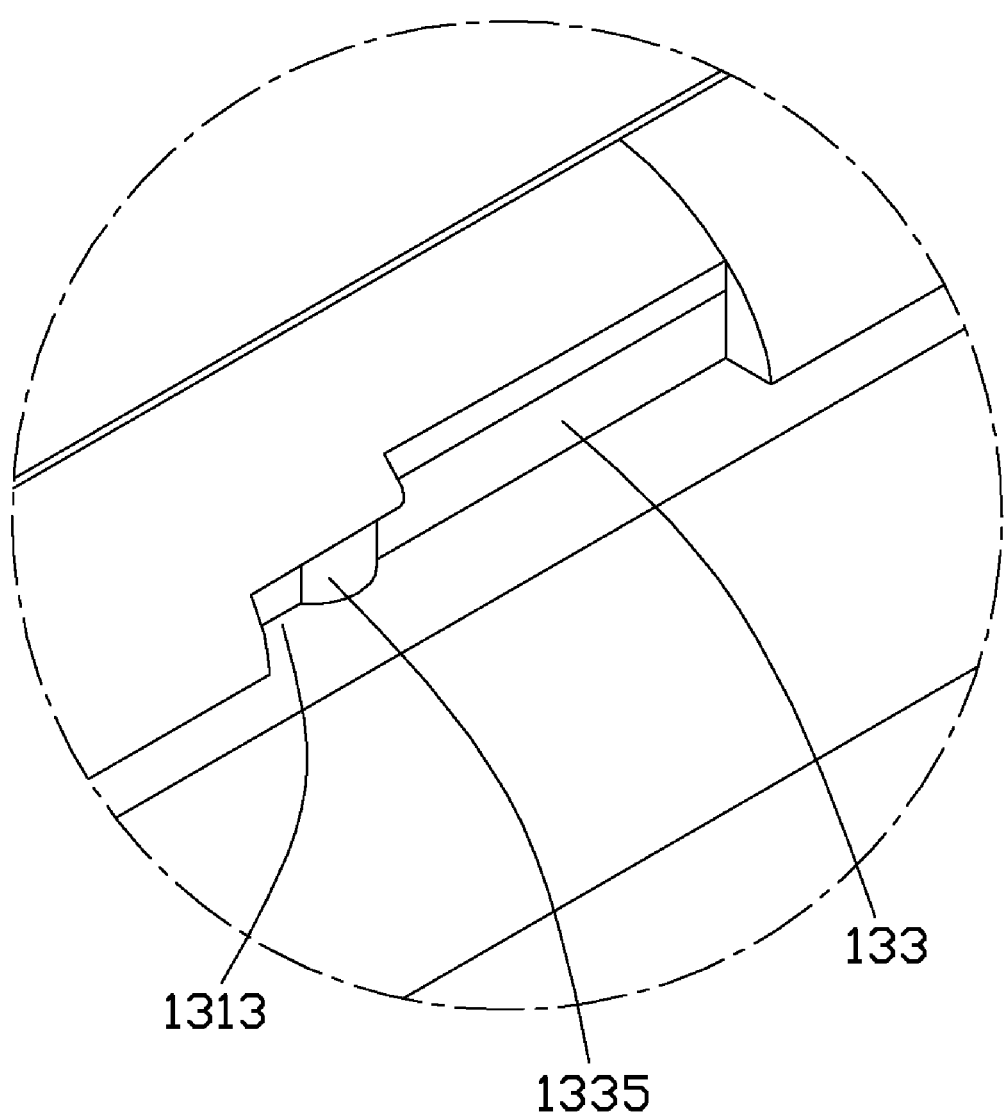
FIG. 3 is an enlarged view of a circled portion III of FIG. 1.

The main body 10 includes two side walls 13 and an end portion 14. A first latching portion 131 and a second latching portion 133 are formed at each side wall 13. Each first latching portion 131 defines an inserting groove 1311 and a latching groove 1313 communicating with the inserting groove 1311. The latching groove 1313 is narrower than the inserting groove 1311. Referring to FIG. 3, the configuration of the second latching portion 133 is similar to that of the first latching groove 1313 except that the second latching portion 133 has an arcuate protrusion 1335 in the latching groove 1313. The end portion 14 defines a latching slot 141 at a middle portion and two notches 143 at two corner.

Figure 4:
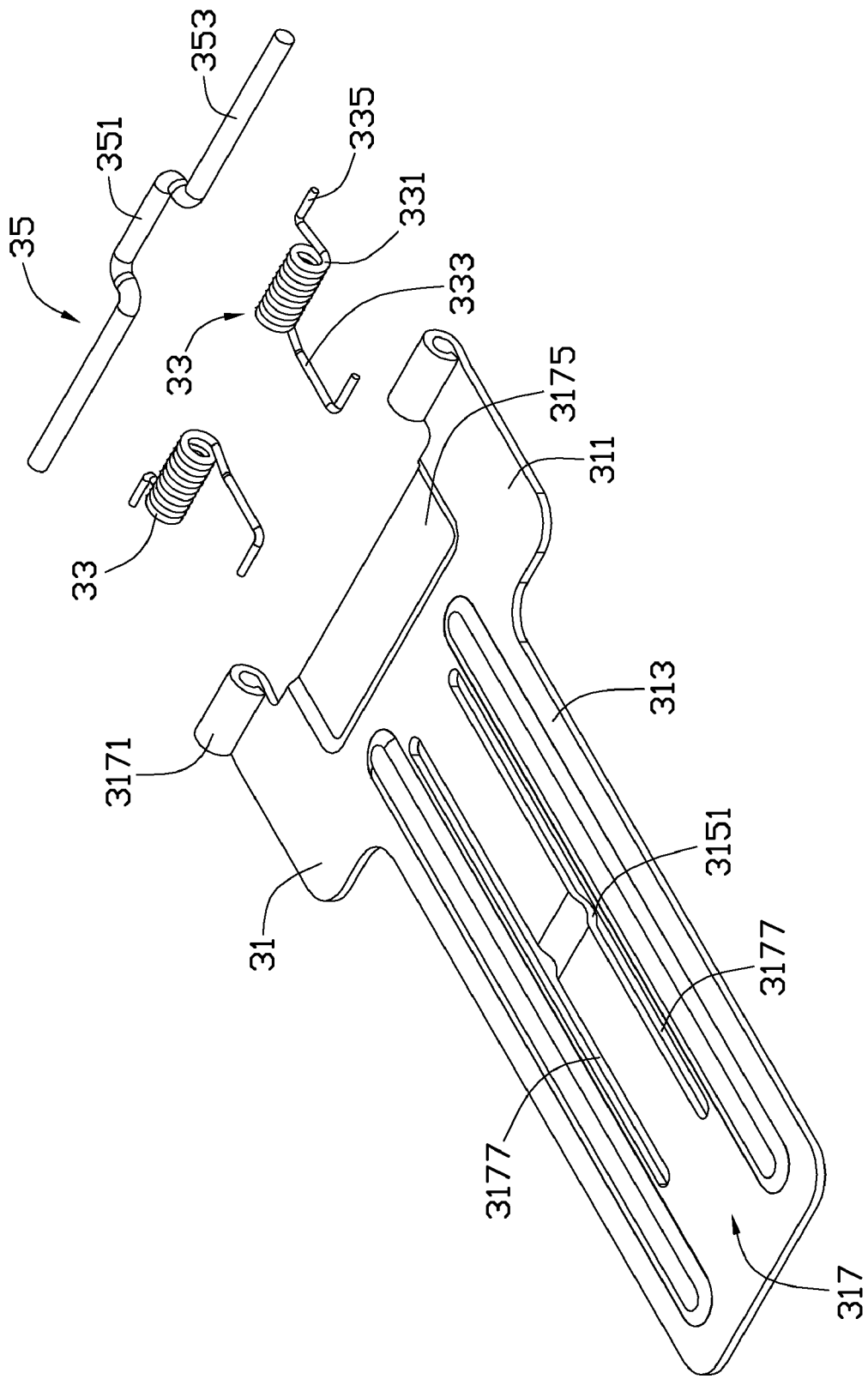
FIG. 4 is an exploded, schematic view of the connecting module shown in FIG. 1.
Figure 5:
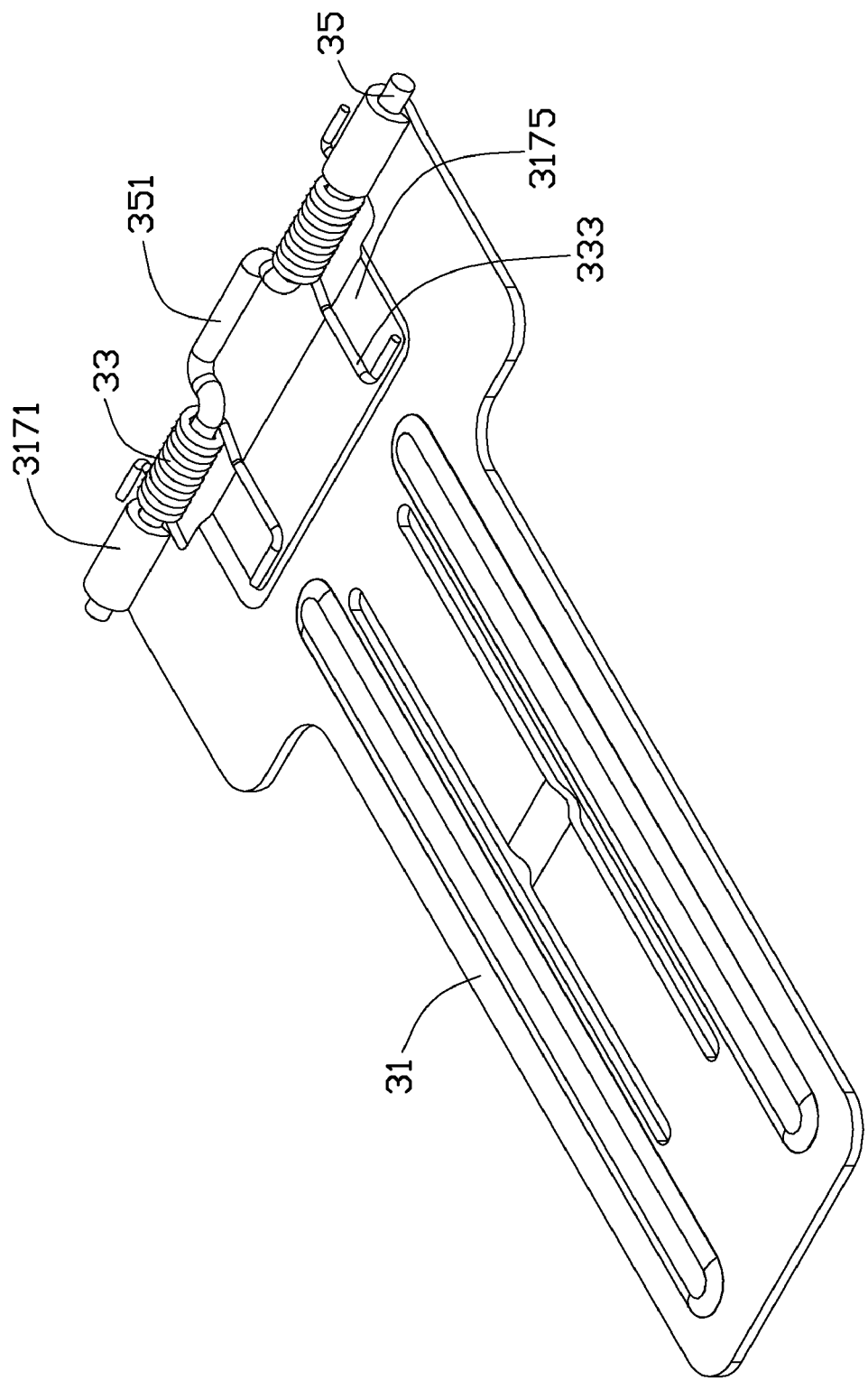
FIG. 5 is an assembled, schematic view of the connecting module shown in FIG. 1.

Also referring to FIGS. 4-5, the connecting module 30 includes a sliding member 31, two torsion springs 33 and a shaft 35. In this embodiment, the sliding member 31 is T-shaped, and includes a main plate 311 and an extending plate 313. The main plate 311 forms two spaced barrels 3171 aligned each other at a top end thereof for receiving two ends of the shaft 35. The sliding member 31 includes a top surface 315 and a bottom surface 317. A recessed portion 3175 is formed in the bottom surface 317 of the main plate 311.

The extending plate 313 longitudinally defines two parallel guiding slots 3177. An arcuate portion 3151 is recessed from the bottom surface 317 to the top surface 315 in a middle portion of the extending plate 313 between the two parallel guiding slots 3177. The arcuate portion 3151 is used for abutting the cover 50 when the sliding member 31 is attached to the cover 50, which reduces the touching surface of the sliding member 31 on the cover 50. Thus, friction between the cover 50 and the sliding member 31 can be reduced, and the cover 50 may easily slide relative to the cover 50.

Each torsion spring 33 includes a first spring end 333 and a second spring end 335. The first spring end 333 and the second spring end 335 are both L-shaped for respectively abutting the recessed portion 3175 and the end wall 151. The shaft 35 includes two shaft ends 353 and a middle portion 351. An axis of the middle portion 351 is parallel to that of the two shaft ends 353, and is engagable in the gap 157 of the main body 10.

Figure 6:
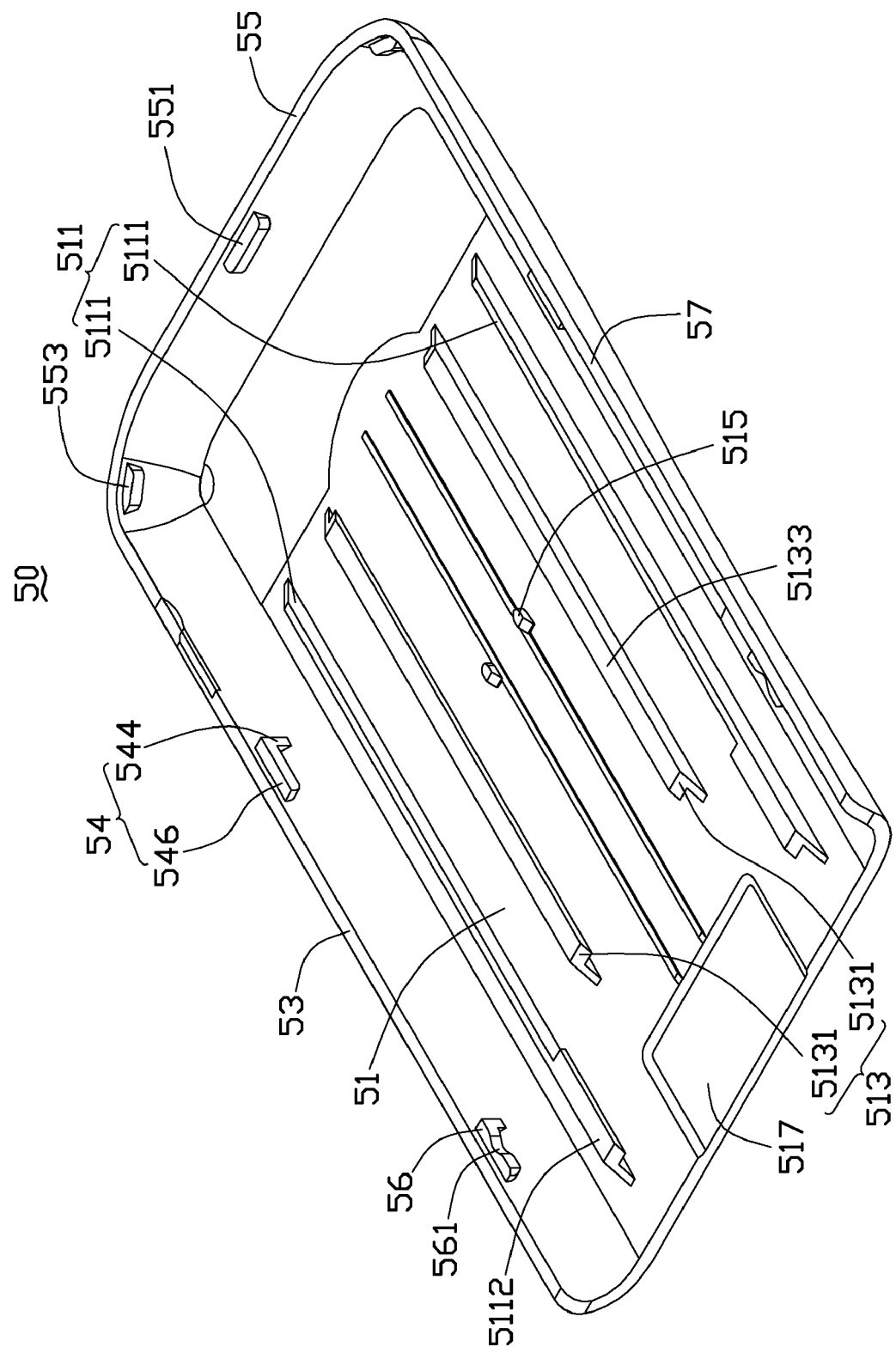
FIG. 6 is similar to FIG. 5, but showing from another aspect.

Referring to FIG. 6, the cover 50 includes a bottom board 51, two side boards 53 and an end board 55. Two projections 515, a first guiding portion 511 and a second guiding portion 513 are formed on the bottom board 51. The two projections 515 are respectively engagable in the guiding slots 3177. The first guiding portion 511 includes two parallel strips 5111. Each strip 5111 has a tab 5112 at one end thereof. The tabs 5112 of the two strips 5111 extend toward each other. A distance between the two strips 5111 is approximately similar to a width of the main plate 311, and the tabs 5112 are configured for engaging with two side edges of the main plate 311. The second guiding portion 513 is positioned between the strips 5111, and includes two guiding rails 5131. Each guiding rails 5131 has an edge 5133 extending over the top surface 315 of the bottom board 51, for engaging with two side edges of the extending plate 313. The bottom board 51 defines a receiving groove 517 for receiving the recessed portion 3175 of the sliding member 31.

A first engaging portion 54 and a second engaging portion 56 are formed on an inner surface of each side board 53. The first engaging portion 54 and the second engaging portion 56 respectively correspond to the first latching portion 131 and the second latching portion 133 of the main body 10. The first engaging portion 54 is L-shaped, and includes a vertical rib 544 and a horizontal rib 546. The horizontal rib 546 is engagable in the latching groove 1313 of the first latching portion 131. The configuration of the second engaging portion 56 is similar to that of the first engaging portion 54 except that the horizontal rib 546 defines an engaging slot 561 for receiving the arcuate protrusion 1335 of the second latching portion 133.

A latch 551 is formed at a middle portion of the end board 55, and two blocks 553 are respectively formed at two corners of the end board 55. The latch 551 is engaged in the latching slot 141, and the blocks 553 are respectively engaged in the notches 143.

Figure 7:
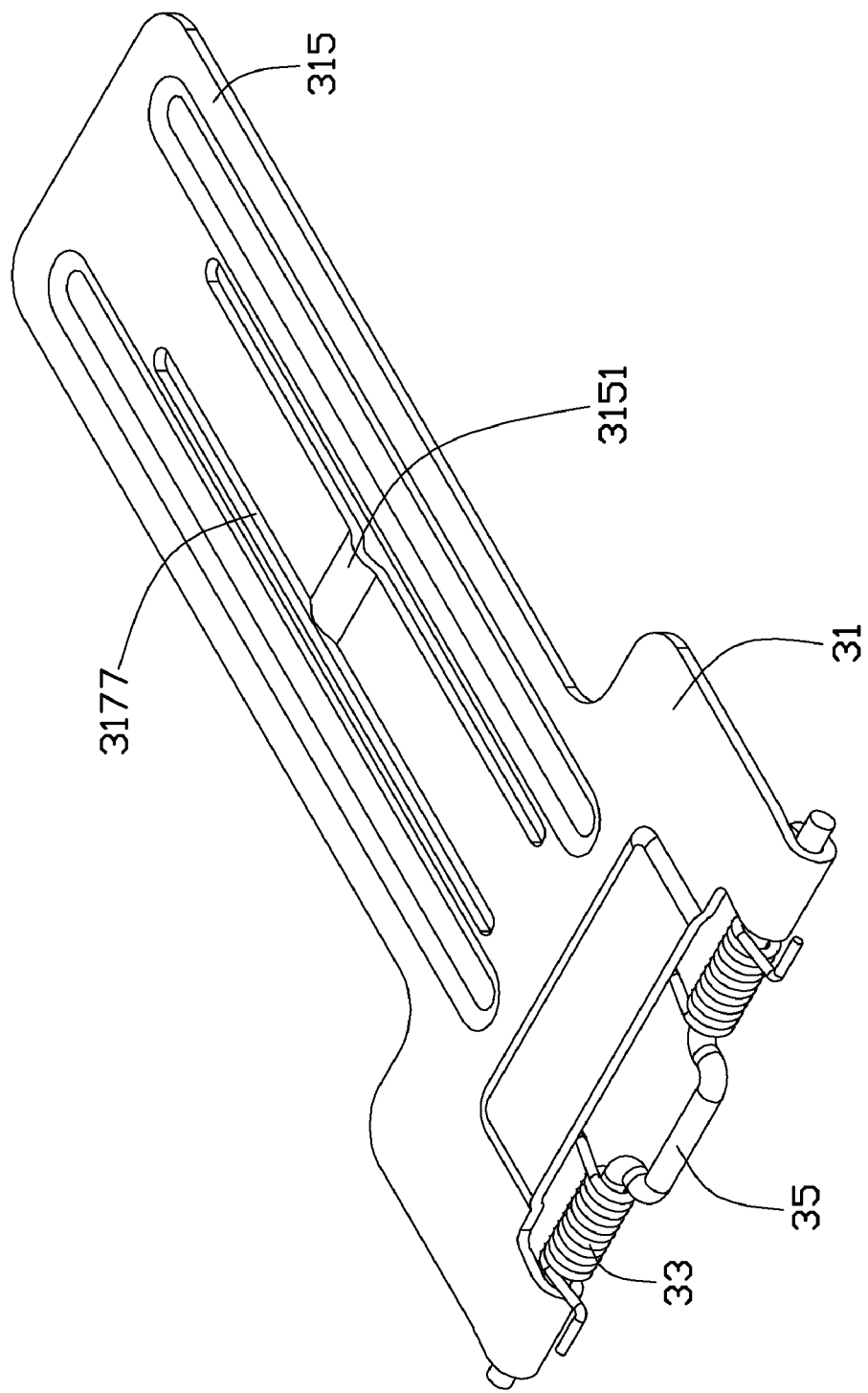
FIG. 7 is a schematic view of the cover shown in FIG. 1.
Figure 8:
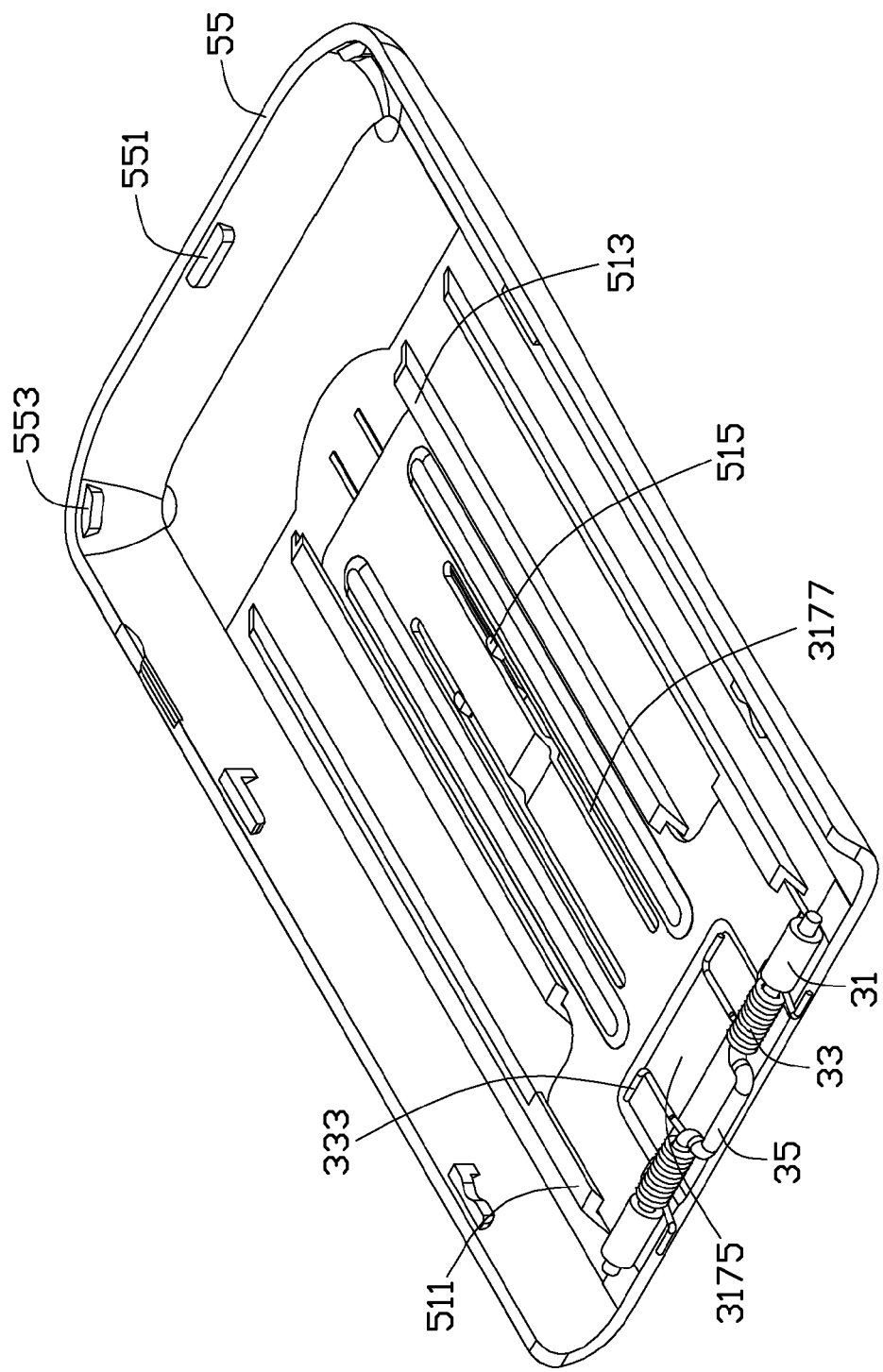
FIG. 8 is an assembled view of the cover and the connecting module shown in FIG. 1.

In assembly of the connecting module 30 to the cover 50, referring to FIGS. 7-8, the two torsion springs 33 are respectively mounted on the two shaft ends 353. The two shaft ends 353 then respectively extend through the barrels 3171 of the sliding member 31, with the first spring ends 333 resisting a bottom surface 317 of the recessed portion 3175. The extending plate 313 of the sliding member 31 is received between the two guiding rails 5131. The guiding projections 515 are engaged in the guiding grooves and the main plate 311 is received between the strips 5111.

Figure 9:
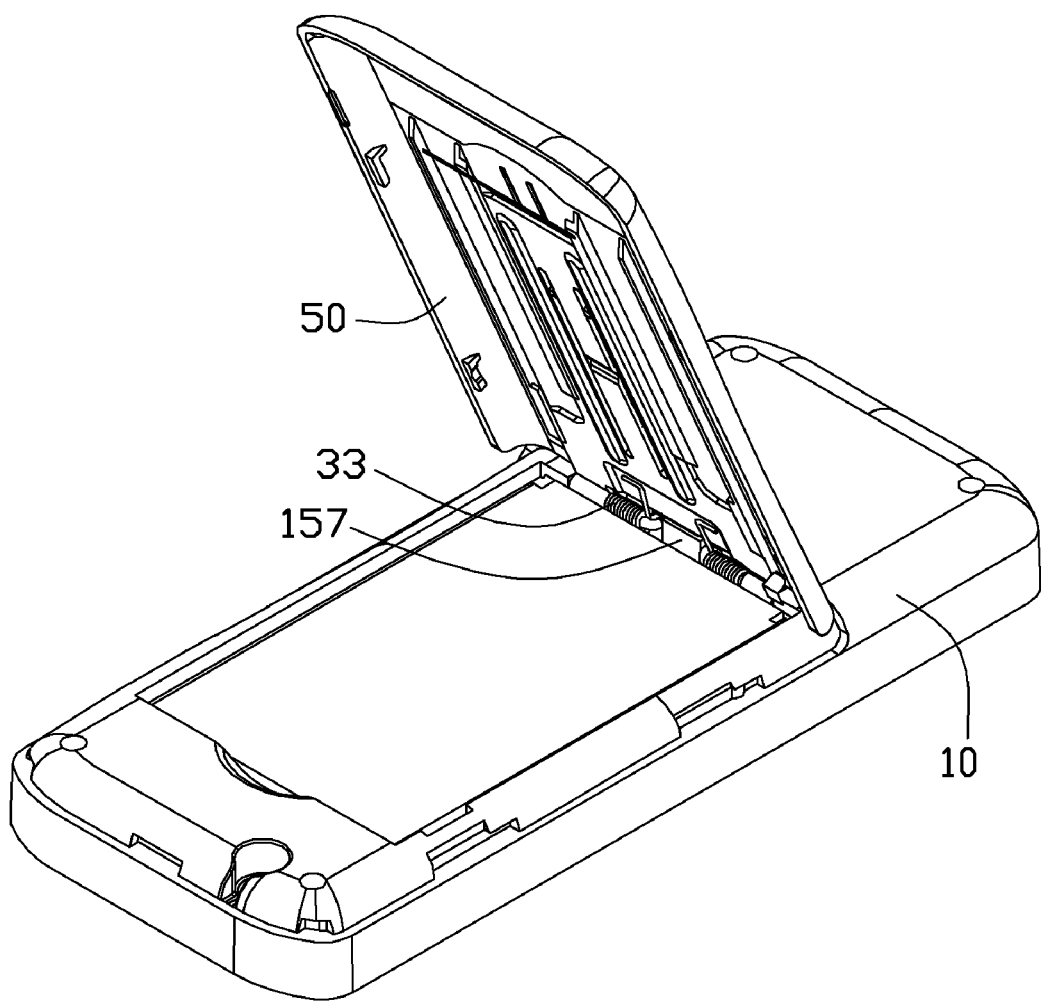
FIG. 9 is an assembled view of the battery cover structure shown in FIG. 1, showing the cover in an opened condition.

In assembly of the cover 50 to the main body 10, referring to FIG. 9, the two shaft ends 353 are respectively inserted into the shaft holes 1531 of the main body 10. The middle portion 351 of the shaft 35 is received in the gap 157. The second spring ends 335 resist the end wall 151 of the main body 10. The cover 50 is rotatable relative to the main body 10 by the shaft 35.

When the cover 50 is closed, the cover 50 is pressed down, and the torsion springs 33 are deformed. The first engaging portions 54 are respectively received in the inserting grooves 1311 of the latching portions 131, 133. The cover 50 is pushed toward the protruding portion 155, and the cover 50 slides relative to the sliding member 31. The horizontal ribs 546 are respectively inserted into the latching grooves 1313 of the latching portions 131, 133, and the arcuate protrusions 1335 of the first latching portions 131 are engaged in the engaging slots 561 of the second engaging portions 56. The latch 551 and the blocks 553 are respectively engaged in the latching slot 141 and the notches 143. Thus, the cover 50 is closed.

When the cover 50 is opened, the cover 50 is pushed away from the protruding portion 155 of the main body 10. The latch 551 and the blocks 553 are disengaged from the latching slot 141 and the notches 143. Also, the horizontal ribs 546 of the cover 50 slide out from the latching grooves 1313 of the main body 10. The cover 50 automatically rotates upward by the rebounding force of the torsion springs 33.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover structure comprising:
   a main body including at least one latching portion, two ledges and a protruding portion;
   a cover including at least one engaging portion, the at least one engaging portion being engaged with the at least one latching portion; and
   a connecting module including: a sliding member, at least one elastic element and a shaft, the sliding member being slidably attached to the cover, the sliding member and the cover being rotatably attached to the main body by the shaft, and the shaft including two shaft ends and a middle portion non-coaxially positioned relative each other, the shafts ends engaging with the ledges of the main body, the middle portion latching with the protruding portion and preventing the shaft from separating from the protruding portion, the at least one elastic element providing a torsional force to allow the cover to automatically rotate relative to the main body.

2. The battery cover structure as claimed in claim 1, wherein the main body defines a cavity for receiving a battery, the cavity includes an end wall, the protruding portion is L-shaped and extends from the wall, a gap is formed between the protruding portion and the wall, the middle portion is received in the gap of the main body.

3. The battery cover structure as claimed in claim 1, wherein an axis of the middle portion is non-coaxial but parallel to the axes of the shaft ends, two barrels are formed at one end of the sliding member, the two ledges are formed on the end wall, each ledge defines a shaft hole receiving one of the two ends of each shaft.

4. The battery cover structure as claimed in claim 3, wherein the at least one elastic element is a torsion spring, the at least one elastic element includes a first spring end and a second spring end, the elastic element is mounted on the shaft, the first spring end resists the sliding member, and the second spring end resists the end wall of the main body.

5. The battery cover structure as claimed in claim 4, wherein there are two elastic elements, and one of the two elastic elements is positioned at each side of the middle portion of the shaft.

6. The battery cover structure as claimed in claim 1, wherein the cover further comprises a bottom board, two projections are formed on the bottom board, the sliding member defines two guiding slots, and the projections are respectively engaged in the guiding slots.

7. The battery cover structure as claimed in claim 6, wherein the sliding member is T-shaped and comprises a main plate and an extending plate, the main plate is wider than the extending plate, a first guiding portion and a second guiding portion are formed on the bottom board of the cover, the first guiding portion is engaged with two side edges of the main plate, and the second guiding portion is engaged with two side edges of the extending plate, the first guiding portion comprises two strips and a tab formed at one end of each strip for preventing the sliding member from separating from the cover.

8. The battery cover structure as claimed in claim 1, wherein the cover includes a bottom board, a first guiding portion is formed on the bottom board, the first guiding portion comprises two strips and a tab formed at one end of each strip for preventing the sliding member from separating from the cover.

9. The battery cover structure as claimed in claim 8, wherein a second guiding portion is formed on the bottom board and positioned between the two strips, the second guiding portion includes two guiding rails, and each guiding rails includes an edge for preventing the sliding member from separating from the cover.

10. The battery cover structure as claimed in claim 1, wherein the at least one engaging portion comprises a vertical rib and a horizontal rib, the at least one latching portion includes an inserting groove and a latching groove, and when the horizontal rib is inserted into the latching groove, the cover is locked in the main body.

11. The battery cover structure as claimed in claim 10, wherein there are four engaging portions and four latching portions, the engaging portions are formed at two sides of the cover, and the latching portions are formed at two sides of the main body.

12. The battery cover structure as claimed in claim 11, wherein the horizontal rib defines an engaging slot, and an arcuate protrusion is formed in the latching groove of the latching portion for being engaged in the engaging slot.

13. A portable electronic device comprising:
- a main body including at least one latching portion, the main body defining a cavity for receiving a battery, the cavity including an end wall, a protruding portion extending from the wall, and a gap being formed between the protruding portion and the wall;
- a cover including a bottom board and at least one engaging portion, the at least one engaging portion being engaged with the at least one latching portion, a first guiding portion formed on the bottom board, the first guiding portion comprising two strips and a tab formed at one end of each strip for preventing the sliding member from separating from the cover;
- a sliding member, the sliding member being slidably attached to the cover; and
- a shaft, the shaft including a middle portion, the middle portion being received in the gap of the main body, the sliding member and the cover being rotatably attached to the main body by the shaft.

14. The portable electronic device as claimed in claim 13, wherein the shaft further comprises two shaft ends, an axis of the middle portion is parallel to the axes of the shaft ends, two barrels are formed at one end of the sliding member, two ledges are formed on the end wall, each ledge defines a shaft hole receiving one of the two ends of each shaft.

15. The portable electronic device as claimed in claim 14, wherein the portable electronic device further comprises two torsion springs, the two torsion springs are mounted on the shaft, each torsion spring includes a first spring end and a second spring end, the first spring ends resist the sliding member, and the second spring ends resist the end wall of the main body.

16. The portable electronic device as claimed in claim 13, wherein two projections are formed on the bottom board, the sliding member defines two guiding slots, and the projections are respectively engaged in the guiding slots.

17. The portable electronic device as claimed in claim 16, wherein the sliding member comprises a main plate and an extending plate, the main plate is wider than the extending plate, a second guiding portion are formed on the bottom board of the cover, the first guiding portion is engaged with two side edges of the main plate, and the second guiding portion is engaged with two side edges of the extending plate.

18. The portable electronic device as claimed in claim 17, wherein the second guiding portion is positioned between the two strips, the second guiding portion includes two guiding rails, and each guiding rails includes an edge for preventing the sliding member from separating from the cover.

19. The portable electronic device as claimed in claim 18, wherein a latch and two blocks are formed at one end of the cover, the main body defines a latching slot and two notches at one end thereof, the latch is engaged in the latching slot, and the blocks are engaged in the notches.

20. A battery cover structure comprising:
- a main body including at least one latching portion and a protruding portion;
- a cover including a bottom board and at least one engaging portion, the at least one engaging portion being engaged with the at least one latching portion; and
- a connecting module including: a sliding member, at least one elastic element and a shaft, the sliding member being slidably attached to the cover, a first guiding portion formed on the bottom board, the first guiding portion comprising two strips and a tab formed at one end of each strip for preventing the sliding member from separating from the cover, the sliding member and the cover being rotatably attached to the main body by the shaft, and the shaft with the protruding portion, the at least one elastic element providing a torsional force to allow the cover to automatically rotate relative to the main body.

* * * * *